United States Patent Office 3,812,161
Patented May 21, 1974

3,812,161
PROCESS FOR PREPARING PRIMARY FURFURYL AMINES
Albert Bouniot, Melle, France, assignor to Melle-Bezons, Melle, Deux-Sevres, France
No Drawing. Original application Feb. 28, 1968, Ser. No. 708,756, now Patent No. 3,565,954. Divided and this application Sept. 10, 1970, Ser. No. 71,210
Claims priority, application France, Mar. 8, 1967, 97,742
Int. Cl. C07d 5/16
U.S. Cl. 260—347.7                     29 Claims

ABSTRACT OF THE DISCLOSURE

The process for preparation of primary amines by reaction of a carbonyl compound with an auxiliary amine in the liquid phase to produce an imine which is then catalytically hydrogenated in the presence of ammonia to produce the primary amine in which the auxiliary amine may be regenerated as a by-product of the reaction for recycling to produce the imine and in which the operations can be carried out batchwise or in a continuous operation.

---

This application is a division of copending application, Ser. No. 708,756, filed Feb. 28, 1968, and entitled "Process for Preparing Primary Amines," now U.S. Pat. 3,565,954.

This invention relates to the preparation of primary amines.

Primary amines can be produced by reaction of carbonyl compounds, such as aldehydes or ketones, with ammonia followed by hydrogenation of the imine produced in accordance with the following equations:

(1)  $\text{R—CO—R'} + NH_3 \rightleftarrows \text{R—C(=NH)—R'} + H_2O$ (2)  $\text{R—C(=NH)—R'} + H_2 \longrightarrow \text{R—CH(NH}_2\text{)—R'}$ In many instances, the imine intermediate is unstable due to secondary decomposition or condensation reactions which give rise to products that are not all converted to the desired primary amine by the hydrogenation step. The result is an undesirable decrease in the expected yield of primary amine.

With furfural, representative of the carbonyl, the following main reactions occur in which, for purposes of simplification, the furan radical is represented by the symbol Fu:

(3)   $\text{Fu—CHO} + NH_3 \rightleftarrows \text{Fu—CH=NH} + H_2O$

The imine Fu—CH=NH is unstable, a phenomenon which is especially prevalent in cases where the imine contains a benzene or furan nucleus near its C=N linkage. The imine condenses with itself to yield hydrofuramide in accordance with the following equation:

(4)  3 Fu—CH=NH $\rightleftarrows$

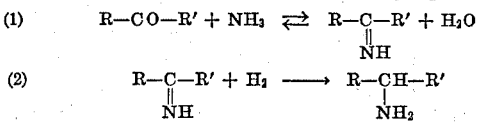

The hydrofuramide converts in furfurine. This conversion occurs slowly in the cold and more rapidly at elevated temperature but always in an irreversible reaction:

(5)   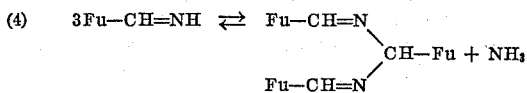

Whereas, hydrogenation causes formation of furfurylamines, (viz, monofurfurylamine and difurfurylamine) from furfurylimine and from hydrofuramide, the same is not true for furfurine.

Benzaldehyde behaves somewhat the same in the presence of ammonia to form benzylimine, then hydrobenzamide, and then amarantine.

Since reactions (3) and (4) are equilibrium reactions, there is always present in the reaction medium an amount of hydrofuramide (respectively hydrobenzamide in the case of benzaldehyde, or a similar substance) which tends to become converted to furfurine (respectively amarantine or similar substance) particularly during the heating step before hydrogenation—all to the detriment of the yeild of the desired primary amine.

To some extent, it is possible to limit reaction (4) by operating with a high concentration of ammonia, and reaction (5) by reducing the temperature and the contact time during the heating step prior to hydrogenation, but these measures are not the entire answer and they involve inconveniences, especially the necessity to make use of high pressure for the hydrogenation step and high dilution of the reaction mixture.

It is an object of this invention to provide a new and improved process for the preparation of primary amines wherein the primary amine can be obtained in high yield and in an efficient and economical manner.

It has been found that it is possible materially to improve the yield of a primary amine $\text{R—CH(NH}_2\text{)—R'}$ from a carbonyl compound $\text{R—CO—R'}$ by first reacting the carbonyl compound with a primary amine $\text{R''—NH}_2$ and then hydrogenating the reaction product in the presence of ammonia. Under such conditions, the hydrogenation produces the primary amine $\text{R—CH(NH}_2\text{)—R'}$ and regenerates the auxiliary amine $\text{R''—NH}_2$ which may be used again in the first stage of the process. In the above formulae, R, R' and R'' mean organic radicals which are not transformed by hydrogen under the hydrogenation conditions employed in which R and R' may be identical or different hydrocarbon radicals, unsaturated or saturated, acyclic or cyclic, unsubstituted or substituted straight chained or branched-chain alkyl radicals having from 1 to 12 carbon atoms, such as methyl, ethyl, propyl, isopropyl, butyl, isobutyl, amyl, isoamyl, hexyl, 2-ethyl butyl, heptyl, octyl, isooctyl, 2-ethyl hexyl, nonyl, isononyl, decyl and dodecyl; alkenyl radicals having 3 to 12 carbon atoms, such as propenyl, butenyl, hexenyl and allyl; alicyclic radicals, such as cyclopentyl, cyclohexyl and methyl cyclohexyl; aralkyl radicals, such as benzyl; aryl and alkaryl radicals, such as phenyl, tolyl or xylyl; heterocyclic radicals, such as furyl; and alkoxy alkyl radicals having from 3 to 12 carbon atoms, such as methoxy propyl, ethoxy propyl, methoxy butyl and ethoxy butyl; the total number of carbon atoms in R+R' being not above 14. R'' can be straight or branched-chain alkyl radicals as specified above, having up to 22 carbon atoms; alkenyl radicals as specified above, having up to 22 carbon atoms; alicyclic radicals, aralkyl radicals, and alkoxy alkyl radicals, as specified above. R' can also be hydrogen, in which event the carbonyl compound is an aldehyde.

Without being bound by this theory, the yield improvement obtained by the process of this invention may be explained by the fact that the carbonyl compound and the auxiliary amine could form an intermediate compound, of the Schiff's base type, which is much more stable than the imine that is formed with ammonia. This increased stability results in the absence of by-products of the types heretofore described and illustrated in equations (4) and (5). By the subsequent hydrogenation step, the Schiff's base would be converted to a secondary amine which would then split into two molecules of the desired primary amine.

Still considering the case of furfurylamine as an example, the following reactions would occur:

(6) Fu—CHO+R″—NH$_2$→ Fu—CH=N—R″+H$_2$O
(7) Fu—CH=N—R″+H$_2$→Fu—CH$_2$—NH—R″
(8) Fu—CH$_2$—NH—R″+NH$_3$→ Fu—CH$_2$—NH$_2$+R″—NH$_2$

In practicing the process of this invention, the reactions are preferably carried out in a liquid phase, such as in an organic diluent as is usually done to avoid excessive temperature increases particularly during the hydrogenation step. The diluent may also permit or facilitate dissolution of the ammonia necessary for the ammonolysis reaction. In this respect, a particularly suitable diluent may be an alcohol, preferably a lower, primary, saturated, aliphatic alcohol such as methanol, ethanol, propanol or butanol. It is desirable that the diluent be easily separated from the reaction products although it is also possible to operate without diluent.

For carrying out the first stage of the process, it is possible simply to mix the reactants one with another, in the presence of the diluent, if used, and at room temperature. The imine formation reaction causes a temperature increase which can raise the temperature of the mixture to 45° C.

As an auxiliary primary amine for reaction with the carbonyl compound, use can be made of an amine identical with that desired to be produced, provided that the amine is stable enough to permit re-use as many times as it is necessary without excessive decomposition. Such is not the case for furfurylamine, exemplified above. Another primary amine is then employed, preferably an aliphatic amine of low or middle molecular weight, such as methylamine, isopropylamine, butylamine or 2-ethyl hexylamine. Incidentally, it should be noted that in using monobutylamine with ethanol as a diluent, for example, it is easy to return these two compounds together to the first step of the operation because they have very close boiling points.

It is possible, without inconvenience, to react the starting carbonyl compound directly with a mixture of auxiliary primary amine, ammonia and diluent because, under such conditions, the carbonyl compound reacts preferentially with the auxiliary primary amine. The mixture resulting from the reaction is then subjected as such to hydrogenation. The possibility of this type of operation is a very practical one since it allows recovery and recycling of the diluent and excess ammonia together with one another and with the auxiliary primary amine regenerated by the hydrogenation step to the first step of the reaction.

The diluent used may contain a noticeable proportion of water, up to 20–25% by weight, without causing substantial decrease in yield. The same is not true in the manufacture of furfurylamine by the aforementioned conventional process because in that case water plays the part of a catalyst favoring the formation of hydrofuramide.

In the process of the present invention, the possibility of water being present in the diluent avoids the necessity of subjecting the diluent to a careful rectification for dehydration. This feature is an important advantage and, more particularly, it permits the use of ethyl alcohol as a diluent, the complete dehydration of which would be expensive but is useless in the present process. Furthermore, the presence of water facilitates dissolution of ammonia in the diluent.

With regard to the proportions of reactants to be brought into play, the auxiliary primary amine should be present in an amount representing at least one-tenth of the stoichiometric proportion with respect to the starting carbonyl compound but it is often preferred that the amount of auxiliary primary amine be in excess of the stoichiometric proportion. However, too great an excess should not be employed since such excess would be at the expensive of the amount of diluent or would require a higher dilution of the reaction mixture. Preferably, the molar proportion of auxiliary amine to diluent is from 1:1 to 2:1 and more preferably about 1.5:1. It should be noted that a high dilution of the starting carbonyl compound in the reaction medium increases the chemical yield of the reaction but, on the other hand, increases the distillation costs and the size of the apparatus required. A proportion of 20–30% by weight of starting carbonyl compound in the reaction mixture is preferred.

For producing as much of the desired primary amine as possible, a substantial excess of ammonia is needed. If, however, this excess is too great, the vapor pressure of the ammonia impedes the hydrogenation reaction and leads to its being carried out under a higher pressure. However, it is possible to increase the excess of ammonia without impeding the hydrogenation procedure, provided that the amount of diluent is also increased or use is made of a diluent in which ammonia is more soluble. When the content of starting carbonyl compound in the mixture of diluent and auxiliary amine is about 25% by weight, the diluent being a lower aliphatic alcohol and the hydrogenation pressure being about 20–25 bar, the optimum molar ratio of ammonia/carbonyl compound is from 1.5:1 to 2:1. For higher pressures, the excess of ammonia may be as high as five to six times the molar amount of carbonyl compound.

The hydrogenation step is preferably carried out in liquid phase in the presence of conventional hydrogenation catalysts, such as Raney nickel, Raney cobalt, or reduced nickel or cobalt deposited on a carrier such as kieselguhr. The ammonia may be introduced either with a liquid mixture to be hydrogenated or mixed with hydrogen during the hydrogenation step. Preferably the hydrogenation temperature is from 80°–150° C. and more preferably within the range of 105°–125° C. and the effective pressure is within the range of 10 to 350 bar, and more preferably 15 to 30 bar.

After the hydrogenation step, there may remain small amounts of secondary amines which may not have been split by the ammonia. It is advantageous to return them to the first stage of the operation. In this way, their formation is not detrimental to the yield.

The entire process may be carried out batchwise or in a continuous operation.

A particular advantage of the process of the present invention is that, in the case where the starting carbonyl compound contains certain unsaturated radicals, for example, the furan nucleus, as in furfural, or the benzene nucleus, as in benzaldehyde, the presence of ammonia in the hydrogenation step avoids the undesirable hydrogenation of these radicals.

It should be noted that, in the aforementioned two examples, on using the present process, there is no risk of clogging of certain items of the apparatus by hydrofuramide or hydrobenzamide crystals. Furthermore, the reactant mixture (carbonyl compound+auxiliary amine +diluent) can be stored without damage for long periods of time whereas such storage results in very significant decreases in yield in the case of conventional reactant mixtures of carbonyl compound+ammonia+diluent.

Though the use of the process of this invention is especially interesting in the case of monofurfurylamine or monobenzylamine manufacture or in similar cases, the present process is not limited to such applications but can be used to advantage whenever condensation or decomposition reaction of the interemdiate imine formed with ammonia, or of the mixture of carbonyl compound and ammonia, are detrimental to the yield of desired primary amine. Such side reactions are, for example, aldolization reactions during the imine formation step, giving rise to amino alcohol production after the hydrogenation step, or the Canizzaro reaction occurring from the aldehyde-ammonia addition product, giving rise to an amide-alcohol mixture, or else the decomposition reaction of the intermediate imine back to carbonyl compound and ammonia, giving rise to alcohol production by the hydrogenation step, especially where the starting carbonyl compound is a high molecular weight ketone. All these reactions occur in most processes of amine production from carbonyl compounds and in all such cases, the imine formation from a primary amine instead of ammonia, in accordance with the present invention, is suitable if it does not render the process too intricate since the intermediate imine formed is more stable than that derived from ammonia.

EXAMPLE 1

This comparative example illustrates the conventional process using ammonia and not a primary amine for the imine formation from the carbonyl compound.

Into a stainless steel autoclave, containing 200 grams of ground catalyst consisting of reduced nickel deposited on diatomite, there is introduced 1230 grams of 96% by volume ethyl alcohol. The contents of the autoclave are agitated under an effective pressure of ammonia of 2 bar to dissolve 116 grams of ammonia in the alcohol. The contents of the autoclave are then put under hydrogen pressure and there is introduced thereinto 400 grams of furfural of 97% by weight purity. As a result of the reaction, the temperature in the autoclave rises by about 30° C.

The contents of the autoclave are then put under an effective pressure of hydrogen of 25 bar, brought to a temperature of 115°–120° C. and maintained at this temperature for one hour. In this way, 99% by weight of the imine is hydrogenated.

The reaction products are rectified. 275 grams of monofurfurylamine and 12 grams of tetrahydro-monofurfurylamine are obtained. The remainder of the furfural has been converted to condensation products which are impossible to separate one from another. The monofurfurylamine yield, based on the furfural, is 70%.

EXAMPLE 2

Into the autoclave of Example 1, containing the same amount of the same catalyst, there is introduced 790 grams of 96% by volume ethyl alcohol and, in accordance with the present invention, 440 grams of monobutylamine as the auxiliary primary amine, and then 400 grams of furfural of 97% by weight purity. The apparatus is brought under ammonia pressure so that 116 grams of ammonia is dissolved in the mixture, as in Example 1.

The hydrogenation is carried out as disclosed in Example 1 but for two hours. The reaction mixture is rectified and the following reaction mixture is obtained:

| | Grams |
|---|---|
| Monofurfurylamine | 360 |
| Tetrahydro-monofurfurylamine | 12 |
| Butyl furfuryl amine | 25 |

The yields, based on the furfural, are 92% of monofurfurylamine and 4% of butyl furfuryl amine. The butyl furfurylamine may be returned for reaction in a subsequent similar operation so that its formation does not represent a loss.

EXAMPLE 3

The operation is carried out substantially as described in Example 1 except that there is introduced into the autoclave:

| | Grams |
|---|---|
| 96% by volume ethyl alcohol | 940 |
| Monobutylamine | 292 |
| 97% fufural | 400 | then:

| | |
|---|---|
| Ammonia | 69 |

At the end of the operation there is obtained 305 grams of monofurfurylamine corresponding to a yield of 78%, and 86.5 grams of butyl furfuryl amine corresponding to a yield of 14%, all based upon the furfural.

EXAMPLE 4

The operation of Example 2 is repeated, except that the furfural is introduced into the previously prepared mixture of ethyl alcohol, monobutylamine and ammonia.

358 grams of monofurfurylamine is obtained corresponding to a yield of 91.5% and 25 grams of butyl furfuryl amine is also obtained corresponding to a yield of 4%, based upon the furfural. Thus the results are substantially the same as those obtained in Example 2.

EXAMPLE 5

The operation of Example 2 is repeated, except that for the 790 grams of 96% by volume ethyl alcohol, a mixture of 550 grams of pure ethyl alcohol and 240 grams of water is substituted.

There is finally obtained 364 grams of monofurfurylamine, or a yield of 93%, and 18.5 grams of butyl furfurylamine, corresponding to a yield of 3%, all based upon the furfural. Again, the results are substantially the same as in Example 2.

EXAMPLE 6

Comparative Example 1 is repeated, except that for the 1230 grams of 96% by volume ethyl alcohol, a mixture of 860 grams of pure ethyl alcohol and 370 grams of water is substituted.

There is obtained 231 grams of monofurfurylamine, corresponding to a yield of 59%, based upon the furfural. This illustrates considerable difference in the influence of noticeable amounts of water, depending upon whether the operation is carried out in accordance with the present invention (Example 5) or in accordance with the conventional method (Example 6).

EXAMPLE 7

The operation of Example 2 is repeated except that for the 96% by volume ethyl alcohol, pure n-butanol is substituted.

There is finally obtained 352 grams of monofurfurylamine, or a yield of 90%, and 37 grams of butyl furfurylamine, corresponding to a yield of 6%, all based upon the furfural. Thus, the results are substantially the same as in Example 2.

EXAMPLE 8

This comparative example, as in Example 1, represents the conventional process.

In the autoclave of Example 1, containing the same amount of the same catalyst, 1200 grams of 96% by volume ethyl alcohol and 400 grams of benzaldehyde are introduced. The apparatus is put under ammonia pressure sufficient to dissolve 110 grams of ammonia in the liquid mixture as in Example 1.

The autoclave is put under an effective pressure of hydrogen of 25 bar and heated to a temperature of 120° C. and it is maintained at this temperature for one and one-half hours. In this manner, 99% by weight of the imine is hydrogenated.

The reaction products are rectified. There is obtained 282 grams of monobenzylamine corresponding to a yield of 70%, and 27 grams of dibenzylamine corresponding to a yield of 7.25%, all based on the benzaldehyde. The distillation residue consists of decomposition products, especially benzyl alcohol, and condensation products.

EXAMPLE 9

In the autoclave of Example 1, containing the same amount of the same catalyst, 790 grams of 96% by volume ethyl alcohol, 420 grams of monobutylamine and then 400 grams of benzaldehyde are introduced. The apparatus is put under ammonia pressure sufficient to dissolve 110 grams of ammonia in the liquid mixture, as in Example 8.

The hydrogenation step is carried out as described in Example 8, and the reaction products are then rectified. There is obtained 346.5 grams of monobenzylamine, corresponding to a yield of 86%, and 55.3 grams of butyl benzylamine, corresponding to a yield of 9%, based upon the benzaldehyde.

EXAMPLE 10

In the autoclave of Example 1, containing the same amount of the same catalyst, there is introduced 500 grams of methyl alcohol, 310 grams of monomethylamine, 210 grams of formaldehyde in the form of a 30% by weight aqueous solution (formalin) and 238 grams of ammonia which is dissolved under pressure in the liquid mixture, in the manner described in Example 1.

The hydrogenation step is then carried out under a pressure of 25 bar, at a temperature of 120° C. for two hours.

After rectification of the reaction products, there is obtained 410 grams of monomethylamine, 78.5 grams of dimethylamine, 4 grams of trimethylamine and 2 grams of high boiling by-products.

The yield based upon formaldehyde is 99%, distributed as follows:

| | |
|---|---|
| To monomethylamine | 46 |
| To dimethylamine | 50 |
| To trimethylamine | 3 |

When the operation is repeated, but without initial introduction of monomethylamine, there is obtained at the end of the operation only 19.5 grams of monomethylamine, corresponding to a yield of 9% based upon formaldehyde. The remainder of the formaldehyde has been converted to urotropine which remains unchanged after the hydrogenation.

EXAMPLE 11

The operation of Example 10 is repeated, except that for the starting 310 grams of monomethylamine, 730 grams of monobutylamine is substituted. There is obtained at the end of the operation:

| | Grams |
|---|---|
| Monomethylamine | 143.5 |
| Dimethylamine | 11 |
| Methyl butyl amine | 84 |
| Dimethyl butyl amine | 21 |
| High boiling by-products | 2 |

The yield, based upon the formaldehyde, is 99%, distributed as follows:

| | Percent |
|---|---|
| To monomethylamine | 66 |
| To dimethylamine | 7 |
| To methyl butyl amine | 20 |
| To dimethyl butyl amine | 6 |

The methyl butyl amine and the dimethyl butyl amine can be recycled to the reaction and thus converted to methylamines and monobutylamine.

EXAMPLE 12

In the autoclave of Example 1, containing the same amount of the same catalyst, there is introduced 200 grams of methyl isobutyl ketone, 600 grams of 96% by volume ethyl alcohol, 146 grams of monobutylamine and 50 grams of ammonia which is dissolved under pressure in the liquid mixture, in the manner described in Example 1.

The hydrogenation step is carried out under a pressure of 25 bar at a temperature of 110° C. for two hours. There is finally obtained 185 grams of 2-amino 4-methyl pentane, corresponding to a yield of 92%. The methyl isobutyl ketone which has not been converted to 2-amino 4-methyl pentane is found in the following forms:

| | Percent |
|---|---|
| In the form of secondary amines, which can be recycled to the reaction | 5 |
| In the form of methyl isobutyl carbinol and unconverted methyl isobutyl ketone | 1 |
| In the form of high boiling by-products | 2 |

When the operation is repeated, but without initial introduction of monobutylamine, there is obtained only 167 grams of 2-amino 4-methyl pentane, corresponding to a yield of 83%. The methyl isobutyl ketone which is not converted to 2-amino 4-methyl pentane is in the following forms:

| | Percent |
|---|---|
| In the form of secondary amine and imine | 3 |
| In the form of unconverted methyl isobutyl ketone | 5 |
| In the form of high boiling by-products | 9 |

EXAMPLE 13

360 grams of butyraldehyde is reacted with 180 grams of monobutylamine at 40° C., 60 grams of water is separated from the reaction mixture by decantation. After standing for twelve hours at 15° C., without crystal formation occurring, the reaction product is diluted with 900 grams of 96% by volume ethyl alcohol. 85 grams of ammonia is dissolved in the resulting solution and the mixture is introduced into the autoclave of Example 1 containing the same amount of the same catalyst as in Example 1.

The hydrogenation step is carried out under a pressure of 25 bar, at a temperature of 120° C. for two hours. There is finally obtained 498 grams of monobutylamine, 32.5 grams of dibutylamine and 11 grams of high boiling by-products.

The yield, based upon the butyraldehyde, is 97% distributed into 87% to monobutylamine and 10% dibutylamine.

For purposes of comparison, 360 grams of butyraldehyde is reacted with 90 grams of ammonia at 40° C. and then 45 grams of water of reaction is separated by decantation. Upon standing for twelve hours at 15° C., crystals of butyraldehyde-ammonia addition product are formed. The mixture is diluted with 900 grams of 96% by volume ethyl alcohol and then 85 grams of ammonia is dissolved in the resulting solution and the mixture is subjected to hydrogenation under the same conditions as in the operation previously described. There is finally obtained:

| | Grams |
|---|---|
| Monobutylamine | 322 |
| Dibutylamine | 19.5 |
| 2-ethyl hexylamine | 3 |
| High boiling by-products | 18 |

The yield, based upon butyraldehyde, is 95%, distributed as follows:

| | Percent |
|---|---|
| To monobutylamine | 88 |
| To dibutylamine | 6 |
| To 2-ethyl hexylamine | 1 |

Comparing this operation with the first portion of Example 13, it will be seen that the use of a primary amine (butylamine) in the imine formation step, in accordance with the practice of this invention, even when in an amount below the stoichiometric proportion, increases the stability of the intermediate imine by comparison with the imine formed from ammonia. Furthermore, the use of a primary amine avoids formation of 2-ethyl hexylamine, which is difficult to separate from the dibutylamine and it also avoids the formation of crystals of butyraldehyde-ammonia addition products.

EXAMPLE 14

360 grams of butyraldehyde is reacted with 365 grams of monobutylamine and 80 grams of water of reaction is separated by decantation. Only 10 grams of water remains dissolved in the dibutylamine that is formed. The mixture is diluted with 1200 grams of n-butanol and the resulting mixture is distilled in a distillation column maintanied under vacuum and heated to cause azetropic entrainment of the remaining water by the butanol. The mixture so dehydrated is saturated with 170 grams of ammonia and then the hydrogenation step is carried out in the manner described in Example 13.

Substantially the same results as in the first experiment of Example 13 are obtained but the final monobutylamine is obtained directly in anhydrous condition. This would not be the case if the intermediate imine had not been dehydrated as aforesaid, because monobutylamine forms an azeotropic mixture with the reaction water retained by the imine prior to the hydrogenation step.

In the conventional case, where the intermediate imine is formed from ammonia, dehydration of the imine is not possible by reason of its instability.

Although the above examples illustrate operation of the invention in batch processes, it is within the scope of the invention to carry out the invention in a continuous operation.

It will be understood that changes may be made in the details of formulation and operation without departing from the spirit of the invention, especially as defined in the following claims.

I claim:

1. The process for preparation of a primary amine having the formula

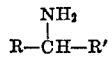

comprising the steps of reacting a carbonyl compound having the formula

wherein R is selected from the group consisting of hydrogen, alkyl of 1 to 12 carbon atoms, alkenyl of 3 to 12 carbon atoms, cyclopentyl, cyclohexyl, methylcyclohexyl, benzyl, phenyl, tolyl, xylyl, furyl and an alkoxy alkyl group of 3 to 12 carbon atoms, and R' is furyl, the total number of carbon atoms of R and R' being not greater than 14, with an auxiliary primary amine to produce an imine and catalytically hydrogenating the imine in the presence of ammonia to produce the primary amine.

2. The process as claimed in claim 1 in which the auxiliarly amine is the same as the primary amine.

3. The process as claimed in claim 1 in which the auxiliary amine is selected from the group consisting of methylamine, isopropylamine, butylamine or 2-ethyl hexylamine.

4. The process as claimed in claim 1 in which the reaction is carried out in the liquid phase.

5. The process as claimed in claim 1 in which the reaction is carried out in an organic diluent which is easily separable from the reaction products.

6. The process as claimed in claim 5 in which the diluent is an alcohol.

7. The process as claimed in claim 6 in which the alcohol is a lower, primary, saturated aliphatic alcohol.

8. The process as claimed in claim 6 in which the alcohol is selected from the group consisting of methanol, ethanol, propanol and butanol.

9. The process as claimed in claim 5 in which the diluent contains up to 25% by weight of water.

10. The process as claimed in claim 1 in which the auxiliary amine is present in an amount of at least one-tenth of the stoichiometric proportion with respect to the carbonyl compound.

11. The process as claimed in claim 5 in which the reaction medium contains 25% to 30% by weight of the carbonyl compound and in which the molecular ratio of auxiliary amine to diluent is within the range of 1:1 to 2:1.

12. The process as claimed in claim 5 in which the amine reaction is carried out by mixing the reactants in the presence of the diluent at ambient temperature.

13. The process as claimed in claim 1 in which the hydrogenation step is carried out in the presence of a hydrogenation catalyst selected from the group consisting of Raney nickel, Raney cobalt, reduced nickel, reduced cobalt, the latter two of which are deposited on a suitable carrier.

14. The process as claimed in claim 1 in which the hydrogenation step is carried out at a temperature within the range of 80° to 150° C.

15. The process as claimed in claim 1 in which the hydrogenation step is carried out at a temperature within the range of 105° to 125° C.

16. The process as claimed in claim 1 in which the hydrogenation step is carried out under an effective pressure within the range of 10 to 350 bar.

17. The process as claimed in claim 1 in which the hydrogenation step is carried out under an effective pressure within the range of 15 to 30 bar.

18. The process as claimed in claim 1 in which the hydrogenation step is carried out in the presence of a molar excess of ammonia.

19. The process as claimed in claim 18 in which the ammonia is present in a molar amount up to six times the molar amount of carbonyl compound.

20. The process as claimed in claim 1 in which the ammonia is supplied to the hydrogenation step along with the liquid mixture to be hydrogenated.

21. The process as claimed in claim 1 in which the ammonia is supplied to the hydrogenation step in admixture with hydrogen.

22. The process as claimed in claim 5 in which the carbonyl compound is reacted with a mixture of the auxiliary amine, ammonia and diluent and the reaction mixture is subjected to the hydrogenation step.

23. The process as claimed in claim 1 which includes the step of collecting the auxiliary amine regenerated during hydrogenation and recycling the collected auxiliary amine to make up at least a part of the auxiliary amine in the imine reaction.

24. The process as claimed in claim 5 which includes the step of recovering the diluent and excess ammonia following the hydrogenation step and recycling the diluent and ammonia to the reaction.

25. The process as claimed in claim 1 which includes the step of recovering small amounts of secondary amine that are formed during hydrogenation and recycling the secondary amine to the initial step of the reaction.

26. The process as claimed in claim 1 which includes the step of dehydrating the imine prior to the hydrogenation step.

27. The process as claimed in claim 26 in which the imine is dehydrated by azeotropic distillation of the water contained therein.

28. The process as claimed in claim 1 in which the reactions are carried out as a continuous operation.

29. The process as claimed in claim 1 in which R is hydrogen.

References Cited
UNITED STATES PATENTS 2,112,970  4/1930  Millington  260—583 X

JOHN D. RANDOLPH, Primary Examiner

B. DENTZ, Assistant Examiner